(12) United States Patent
Chao

(10) Patent No.: US 6,404,334 B1
(45) Date of Patent: Jun. 11, 2002

(54) TAILLIGHT MODULE FOR MOTOR VEHICLE

(75) Inventor: Lance Chao, Taipei (TW)

(73) Assignee: Kiwi Auto Accessories Co., Ltd., Taipei Hsien (TW)

( * ) Notice: Subject to any disclaimer, the term of this patent is extended or adjusted under 35 U.S.C. 154(b) by 0 days.

(21) Appl. No.: 09/987,221

(22) Filed: Nov. 14, 2001

(51) Int. Cl.[7] .................................................. B60Q 1/52
(52) U.S. Cl. ....................... 340/472; 340/464; 340/465; 340/475; 340/479; 362/459; 362/499
(58) Field of Search ................................. 340/463, 464, 340/465, 467, 468, 471, 472, 475, 479; 362/459, 487, 497, 498, 499

(56) References Cited

U.S. PATENT DOCUMENTS

| | | | | |
|---|---|---|---|---|
| 4,255,887 A | * | 3/1981 | Murai ........................... 40/206 |
| 4,857,890 A | * | 8/1989 | Solow ........................... 340/479 |
| 5,642,094 A | * | 6/1997 | Marcella ....................... 340/479 |
| 5,838,228 A | * | 11/1998 | Clark ........................... 340/436 |
| 5,847,646 A | * | 12/1998 | Mucciacciaro ............... 340/479 |

* cited by examiner

*Primary Examiner*—Daniel J. Wu
(74) *Attorney, Agent, or Firm*—Rosenberg, Klein & Lee

(57) ABSTRACT

A taillight module for motor vehicles attached and coupled to the license plate groove comprising a base, a casing, and a display plate. The base is coupled to the license plate groove. A plurality of lamps is disposed in the base. The lamps are coupled to the circuits of brake light, signal light, and headlight of the motor vehicle to provide an illumination source. The display plate is disposed between the housing and the base. The display plate has labels of text, graphics, and symbols on the surface of the display plate. The taillight module provides a third set of rear light structure for motor vehicles to clearly display a third brake light, signal lights, reverse light, or decorative lights through the lamps.

4 Claims, 5 Drawing Sheets

TAILLIGHT MODULE FOR MOTOR VEHICLE

BACKGROUND OF THE INVENTION

1. Field of the Invention

The present invention relates to a taillight module for motor vehicles, more particularly to a taillight module installed to the license plate groove at the rear of a motor vehicle and used for warning and illumination.

2. Description of the Prior Art

While a motor vehicle is traveling at nights, it relies on the taillight module to provide warning and illumination for the following cars. The driver of a motor vehicle traveling in high speed must be able to clearly and quickly see the warning light and illumination given by the taillight module of the front motor vehicle in order to ensure the driving safety. However, the traditional taillight modules of motor vehicles used for giving warning, signals and illumination are disposed on both sides of the rear of the motor vehicle. As to a driver who needs to keep his vision straight ahead, it may cause accidents or hit the car in the front due to the deviation or unobvious vision.

Further, the traditional brake light of the taillight module is not obvious enough for night driving, and even a third brake light is added, it does not help much to the driver in the following motor vehicle due to its small area and being installed at a high location on the rear windshield. On the contrary, such unobvious brake light structure may cause misjudgment and results in traffic accidents. In addition, the traditional taillight module is restricted to an illumination of fixed configuration and indication function for a motorcade or in a car racing. It is unable to provide an illumination or identification for each motor vehicle, which substantially limits the application of the illumination function of the taillight module.

Therefore, the primary objective of the present invention is to provide a taillight module for motor vehicles, which provides a straight vision at the brake light, the signal lights, and the reverse light substantially and reduces traffic accidents due to misjudgment by the driver in the following car.

The further objective of the present invention is to provide a taillight module for motor vehicles, which provides a third brake light with a larger display area to facilitate the identification for the driver of the following motor vehicle.

Another objective of the present invention is to provide a taillight module for motor vehicles having the effects of decoration, identification, and illumination.

According to the invention, the taillight module for motor vehicles comprises a taillight module coupled to a bottom surface of a license plate groove at the rear of a motor vehicle. The taillight module has a plurality of lamps in the license plate groove, a housing and a display plate. The base is coupled to the license plate groove in which a plurality of lamps is disposed. The lamps are connected to the brake warning, signal indication, and reverse warning. The illumination control circuit of the motor vehicle provides the corresponding brake warning, signal indication, reverse warning, and the display source for the illumination. The display plate is disposed between the housing and the base, and its surface is labeled with text, labels, graphics, and symbols, thereby a third brake light, signal light, reverse light, or decoration light can be displayed by the lamps that form a third taillight module.

BRIEF DESCRIPTION OF THE DRAWINGS

Other objects, features, and advantages of the invention will become apparent from the following detailed description of the preferred. The description is made with reference to the accompanying drawings, in which.

DESCRIPTION OF THE PREFERRED EMBODIMENT

Figure 1:
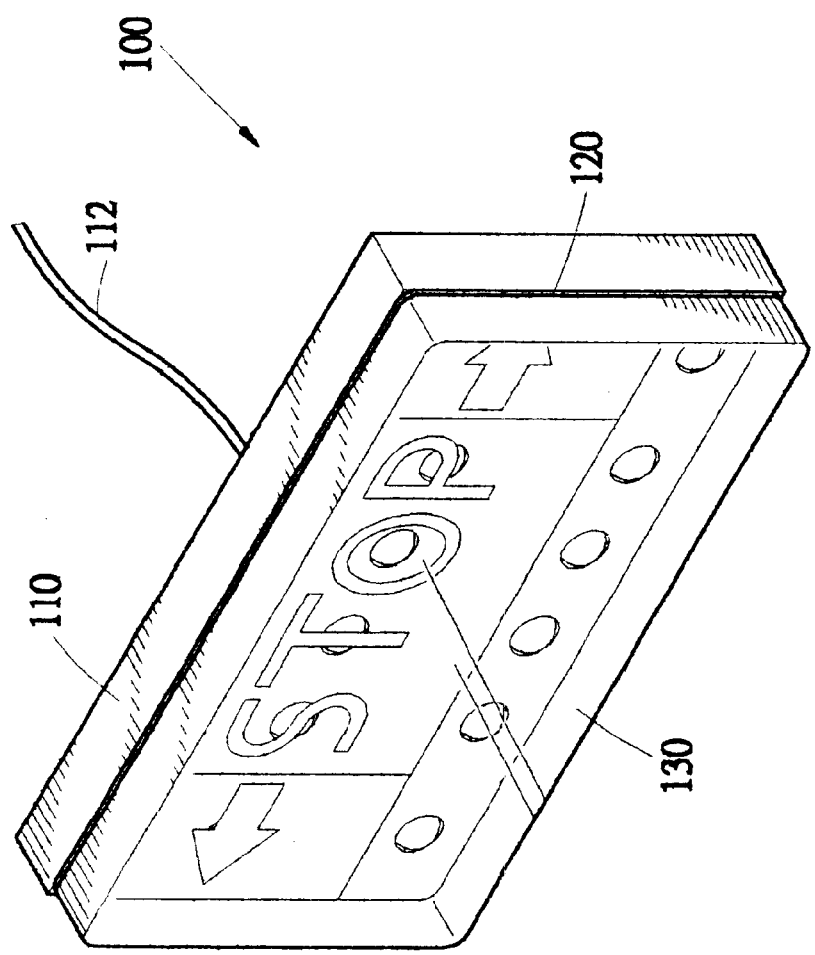
FIG. 1 is a perspective view of the taillight module of the present invention.
Figure 2:
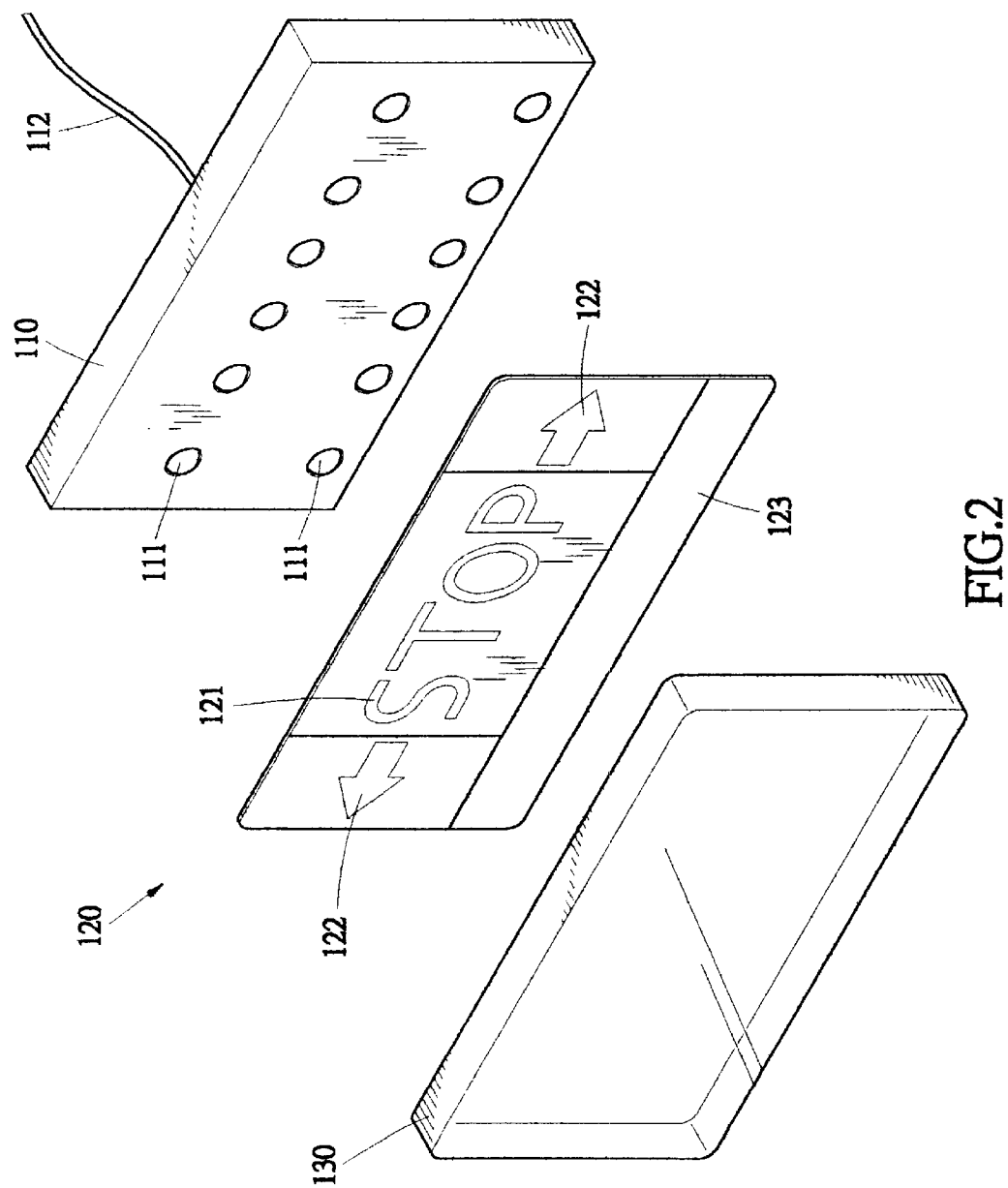
FIG. 2 is an exploded view of the taillight module of the present invention.
Figure 3:
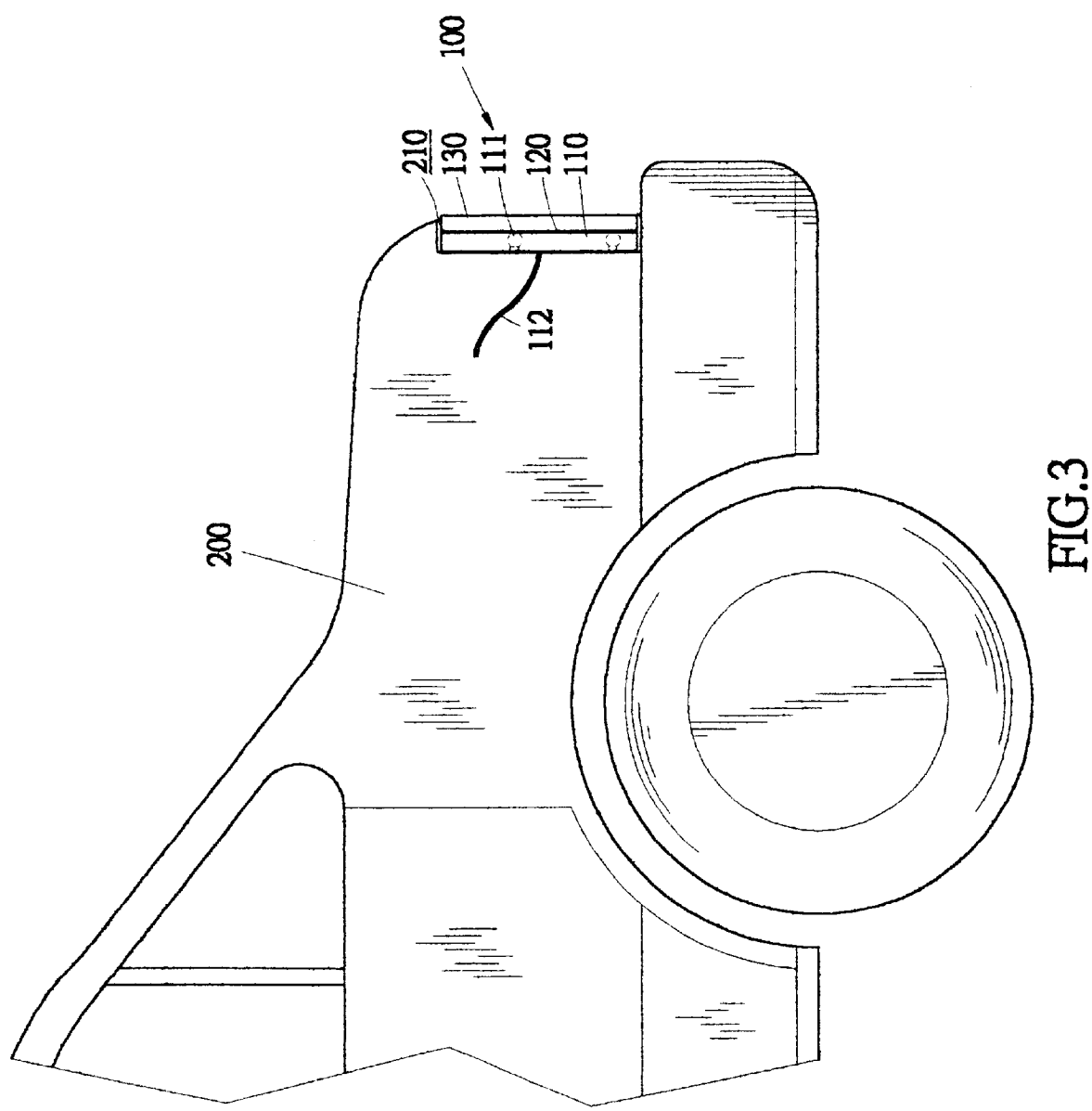
FIG. 3 is a side view showing the taillight module coupled to the frame of the license plate at the rear of the motor vehicle.

Please refer to FIG. 1 to FIG. 3. The taillight module 100 of the present invention is attached and coupled to a license plate groove 210 at the rear of a motor vehicle (as shown in FIG. 3). The taillight module 100 comprises a base 110 which is attached to the bottom surface of the license plate groove 210. In a preferred embodiment (not shown), the base 110 is adhesively attached to the bottom surface of the license plate groove 210. A plurality of lamps 111 is disposed in the base 110. The lamp 111 are connected to the brake light, signal light, and reverse light in the motor vehicle 200 by conductive lines 112 respectively in order to provides the illumination function for a corresponding brake warning, signal indication, and reverse warning.

A display plate 120 is a transparent plate and disposed at the front end of the base 110. A plurality of labels 121, 122, 123 is disposed on the surface of the display plate 120. The displayed label 121, 122, or 123 can be, but not limited to, a specific text, graphics, or symbols. In the embodiment shown in FIG. 1 to FIG. 3, the text "STOP" is used for brake warning as shown in the display label 121; the arrow signs "←" and "→" to stand for the left and right signals respectively as shown in the display label 122, and a transparent rectangular block is used to represent reverse warning. The display labels 121, 122, and 123 can use the light source from the corresponding lamps 111 at the base 110 to display the corresponding function.

The housing 130 coupled to the base 110 is used to cover and protect the base 110 and the display plate 120 to project the corresponding display for braking warning, signal indication, and reverse warning signals to the outside.

Figure 4:
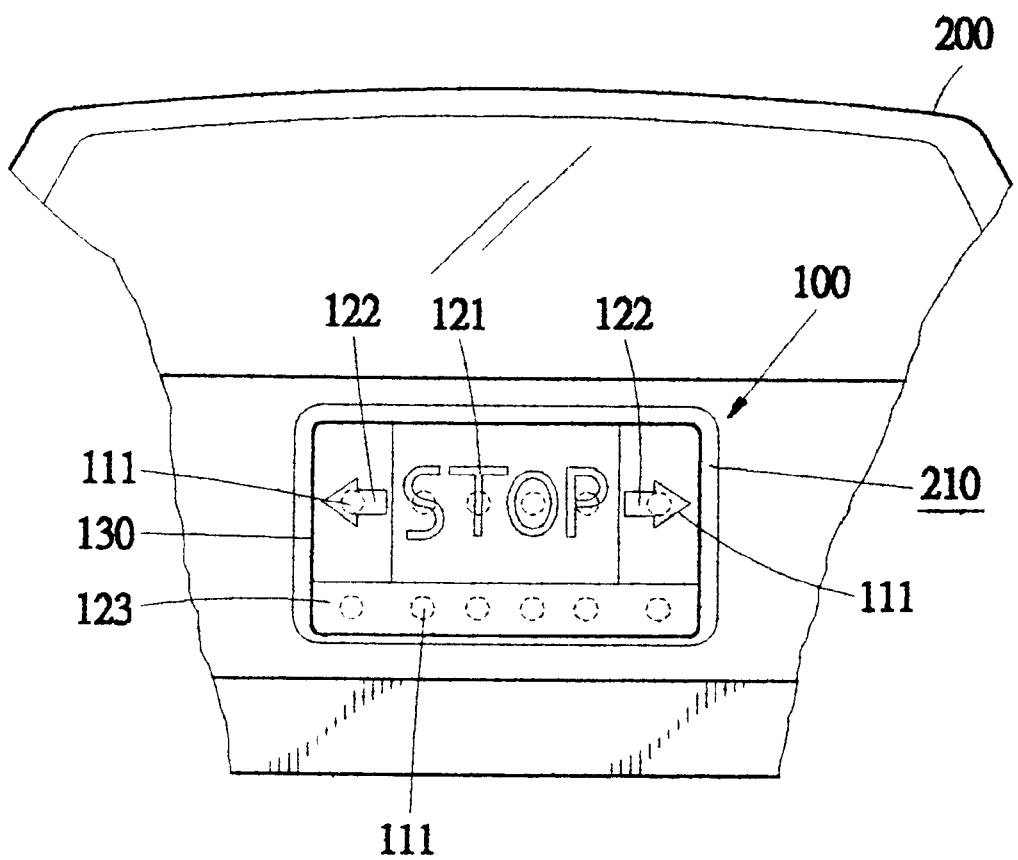
FIG. 4 is a partially enlarged view showing the taillight module used for decoration, identification, and illumination.

Please refer to FIG. 4, which shows an application of a taillight module 100 at the license plate groove 210 at the rear of a motor vehicle 200 as shown in FIG. 1 and FIG. 2. While the motor vehicle is traveling, the taillight module 100 provides the function of obvious straight vision for braking warning, signal indication, and reverse warning for the driver in the following car. It provides the driver a display function of the taillight with an obvious and convenient way for identification, such as the third brake light having a large display area, signal light, and reverse light. It greatly reduces the chance of visual deviation and misjudgment for the following cars.

Figure 5:
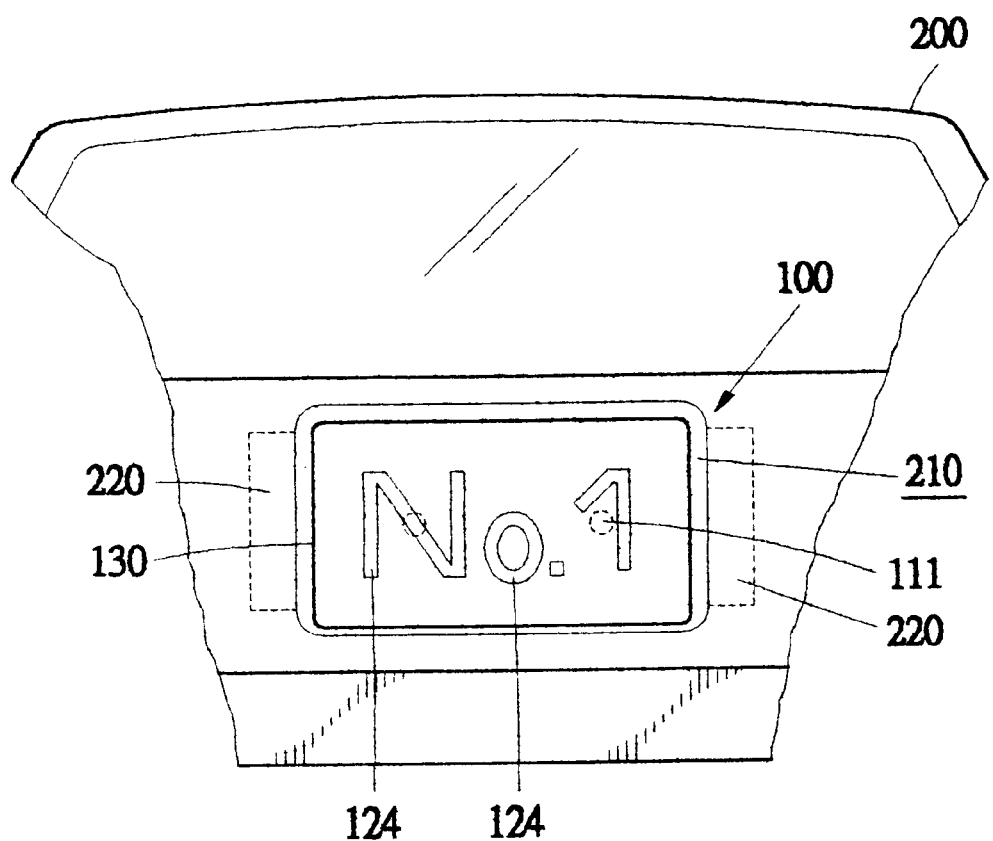
FIG. 5 is a partially enlarged view of another preferred embodiment of the present invention showing the taillight module used for decoration, identification, and illumination.

Please refer to FIG. 5, which shows another embodiment of the taillight module of the present invention. The display plate 120 has a display label 124 to facilitate the identification of a motor vehicle's decoration and illumination by the following car. The lamps 111 of the base 110 can be used as the permanent illumination and identification. It can also be used as the light source for the illumination for the license plate lamp 220 originally built in the periphery of the license plate groove 210. It can be applied to the motorcade for the identification of a motor vehicle or to a racing car in the area for its decoration and license plate number identification. It attains both purposes of decoration and identification.

From the structure of a taillight module 100 at the rear of the motor vehicle as shown in FIG. 1 to FIG. 5, it is obvious that the taillight module 100 at the rear of a motor vehicle according to the present invention can make use of the different arrangements of the lamps 111 at the base 110 and the variations of the display labels 121, 122, 123, and 124 of the display plate 120 to meet with different requirements for the taillight module 100 with different display contents. The taillight module 100 further extends the display function and the range of a taillight display at the rear of a motor vehicle 200 and avoids the dull display of the conventional taillight display model. It can strengthen the display function at the rear of a motor vehicle and further beautifies the appearance of the motor vehicle.

What is claimed is:

1. A taillight module, comprising:

a base coupled to a bottom surface of a license plate groove at the rear of a motor vehicle;

a plurality of lamps disposed in the base, the lamps connected to the brake warning, signal indication, reverse warning, and the illumination control circuit of the motor vehicle to provide the corresponding brake warning, signal indication, reverse warning, and the display source for the illumination;

a display plate disposed at the front end of the base, the display plate having a plurality of display labels at the surface, and the display labels representing the text, graphics, and symbols for the brake warning, signal indication, reverse warning and the decoration and illumination at the rear of the motor vehicle, and being projected by the light source from the lamp at the corresponding position of the base; and a housing being coupled to the base and the display plate, such that the display labels on the display plate can be projected outside to display the corresponding brake warning, signal indication, reverse warning or the decoration and illumination.

2. The taillight module as claimed in claim 1, wherein the bottom surface of the base is adhesively attached to the bottom surface of the license plate groove at the rear of the motor vehicle.

3. The taillight module as claimed in claim 1, wherein the display plate is a transparent plate.

4. The taillight module as claimed in claim 1, wherein the lamps are connected to a control circuit of the brake warning, signal indication, reverse warning, decoration and illumination of the motor vehicle by conductive lines, respectively.

* * * * *